United States Patent [19]
McKenna

[11] Patent Number: 5,495,243
[45] Date of Patent: Feb. 27, 1996

[54] EMERGENCY VEHICLE ALARM SYSTEM FOR VEHICLES

[76] Inventor: Lou McKenna, 1526 E. Shore Dr., St. Paul, Minn. 55106

[21] Appl. No.: 281,479

[22] Filed: Jul. 27, 1994

Related U.S. Application Data

[63] Continuation of Ser. No. 43,327, Apr. 6, 1993, abandoned.

[51] Int. Cl.$^6$ .................................................. G08G 1/00
[52] U.S. Cl. .................... 340/902; 340/903; 340/555; 340/556; 359/154; 364/461
[58] Field of Search ............................. 340/902, 904, 340/906, 901, 907, 942, 555, 556, 961, 903, 435, 436; 359/109, 142, 148, 154; 364/461

[56] References Cited

U.S. PATENT DOCUMENTS

| | | |
|---|---|---|
| 2,457,502 | 12/1948 | Shepherd . |
| 3,011,580 | 12/1961 | Reid . |
| 3,514,610 | 5/1970 | Huston et al. . |
| 3,576,371 | 4/1971 | Ulicki . |
| 3,611,385 | 10/1971 | McHenry ............................ 250/83.31 |
| 3,620,626 | 11/1971 | Daly et al. . |
| 3,673,560 | 6/1972 | Barsh et al. . |
| 3,854,119 | 12/1974 | Friedman et al. . |
| 3,876,940 | 4/1975 | Wickford et al. . |
| 4,139,848 | 2/1979 | Maxwell, Jr. . |
| 4,209,769 | 6/1980 | Chronerberry . |
| 4,249,160 | 2/1981 | Chilvers ................................ 340/902 |
| 4,277,170 | 7/1981 | Miles . |
| 4,587,522 | 5/1986 | Warren . |
| 4,764,978 | 8/1988 | Argo et al. . |
| 4,794,394 | 12/1988 | Halstead ................................ 340/902 |
| 4,952,931 | 8/1990 | Serageldin et al. . |
| 4,998,093 | 3/1991 | Benoit . |
| 5,005,004 | 4/1991 | Udofot . |
| 5,028,129 | 7/1991 | Smith . |
| 5,126,735 | 6/1992 | Trevijano ............................... 340/902 |
| 5,172,113 | 12/1992 | Hamer . |
| 5,289,181 | 2/1994 | Watanabe et al. . |

FOREIGN PATENT DOCUMENTS

| | | |
|---|---|---|
| 29450/79 | 10/1977 | Australia . |
| 900003 | 5/1972 | Canada . |
| 325888 | 1/1988 | European Pat. Off. . |
| 2610443 | 9/1977 | Germany . |
| 439008 | 6/1992 | Germany . |
| 301399 | 12/1988 | Japan . |
| 1001394 | 8/1965 | United Kingdom . |

*Primary Examiner*—John K. Peng
*Assistant Examiner*—Nina Tong
*Attorney, Agent, or Firm*—Haugen and Nikolai

[57] ABSTRACT

A light activated alarm system for indicating to the occupants of a second vehicle the presence of a first vehicle. The alarm system comprising a photosensitive cell, a receiver circuit and indicators. The photosensitive cell is mounted in one of a variety of locations on the second vehicle, including the rear bumper, the rear window well, the stop light in the rear window well, the roof or the antenna. The photosensitive cell is either silver dollar shaped or an array of preferably five photo cells in a semispherical or box shape. The signal from the photosensitive cell is detected, amplified, filtered and identified by the receiver circuit. When a signal from an activated light source is identified, the receiver circuit generates an indicator signal. The indicator signal activates one or more indicators to alert the occupants of the second vehicle to the presence of the first vehicle. Indicators include turning on or muting the second vehicle's radio system and transmitting a signal through the radio system, turning off or muting the radio system and transmitting a signal through a separate buzzer system and turning on a separate visual display that flashes the words "Emergency Vehicle" or a red light. A return, feed-back indicator is also provided for notifying the driver of the first vehicle that the second vehicle received and processed the signal from the light source.

10 Claims, 1 Drawing Sheet

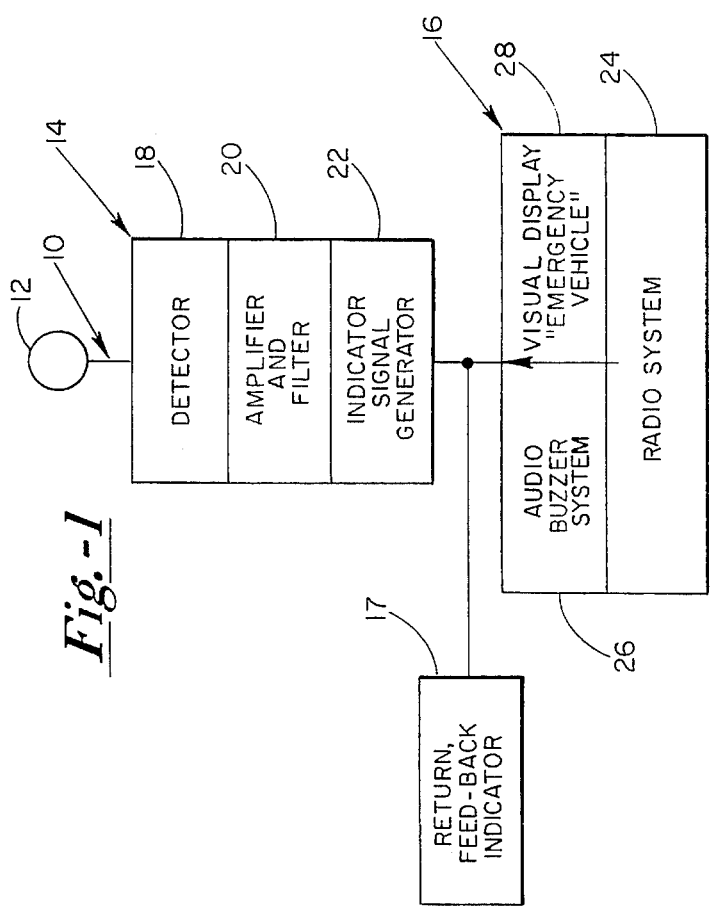
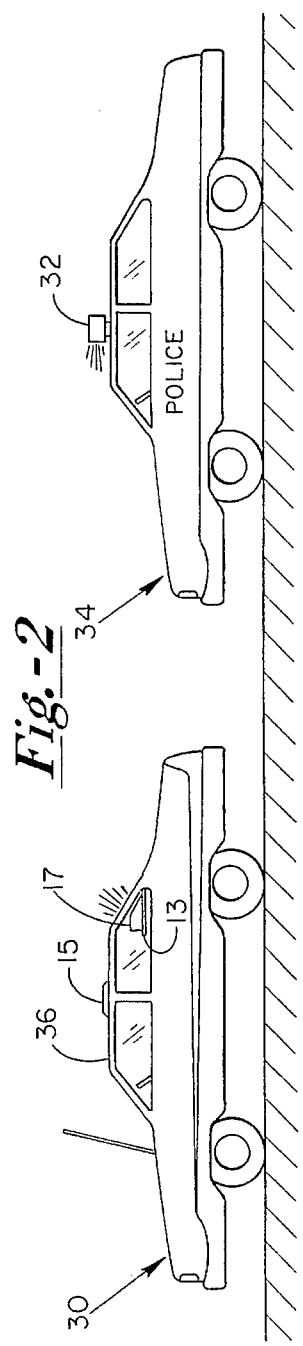
Fig.-1
Fig.-2

EMERGENCY VEHICLE ALARM SYSTEM FOR VEHICLES

This is a Continuation of application Ser. No. 08/043,327, filed on Apr. 6, 1993, abandoned.

BACKGROUND OF THE INVENTION

I. Field of the Invention

This invention relates generally to alarm systems for indicating to the occupants of a second vehicle the proximity of a first vehicle. More particularly, this invention relates to an alarm system wherein a first vehicle's strobe light or laser light source activates indicators in a second vehicle to alert the occupants of the second vehicle to the proximity of the first vehicle.

II. Discussion of the Prior Art

Many modern vehicle passenger compartments are designed and built to be quiet when their windows are closed. Outside noises coming from car horns and radios are prevented from entering the passenger compartment and distracting the driver. Unfortunately, emergency vehicle sirens and train whistles are also prevented from entering the passenger compartment. Car radios or sound systems played at moderate levels inside the vehicle make it even more difficult to hear outside alarms. Thus, an emergency vehicle siren or a train whistle may be undetected by the occupants of a vehicle. This creates a hazardous situation on the highways.

Emergency vehicles need an unobstructed path to respond to an emergency within an acceptable time frame. The occupants of the emergency vehicle need to be able to change traffic signals and alert the drivers of other vehicles to the presence of the emergency vehicle. In the past, radio frequency energy has been used to alert the occupants of one vehicle to the presence of another vehicle. Radio frequency signals were transmitted from one vehicle and detected by an unsuspecting second vehicle. Upon detection, a warning signal was generated in the second vehicle. The warning signal was transmitted over the radio or through independent audio and visual components. This method is shown in U.S. Pat. No. 3,854,119, issued to Friedman et al, and U.S. Pat. No. 3,876,940, issued to Wickord et al.

The Friedman patent describes receiving and identifying amplitude modulated signals to operate switching means for activating devices such as audio speakers, light emitting diodes, panel displays or neon lights in relation to the amplitude of the received signals. The Wickord patent discloses a warning device utilizing radio transmission on an assigned frequency having a transmitter in the emergency vehicle and a receiver in the regular vehicle. One feature of the Wickord patent is the conversion of the received signal to the intermediate frequency of a radio receiver, muting the broadcast reception on the radio or turning the radio on (if it is off), and applying a warning signal through the radio system. In each of these patents, the activating radio frequency energy is transmitted in all directions. Radio frequency energy, however, is not easily blocked by buildings or other objects.

In a rural area, where few emergencies occur and few trains travel, an occasional interruption by a train or emergency vehicle alarm signal may be acceptable. However, in a city or suburban environment, emergencies occur more frequently. Constant interruption of the radio and subsequent distraction of the driver due to an emergency occurring many blocks away may create a hazard. Thus, a signal limited in range by objects in its path is desired. It is also desirable to change traffic signals in the immediate vicinity of the emergency vehicle. Neither the Friedman nor the Wickord patent disclose anything about changing traffic signals to accommodate an emergency vehicle and both use radio frequency energy.

To be useful in cities and suburbs, the energy transmitted by the emergency vehicle's alarm system must be limited to the immediate vicinity. The system should regulate traffic flow by changing traffic signals and alerting the drivers of vehicles to the presence of an emergency vehicle. The present invention meets these needs by using a strobe light or laser light source situated on an emergency vehicle or train. The light signal is detectable on a line of sight basis. Thus, if an emergency is occurring many blocks away and the second vehicle is not in the line of sight of the emergency vehicle, the audio and visual warning indicators in the second vehicle will not be activated.

Light has been used in the past to change traffic signals to accommodate emergency vehicles. One such system is described in U.S. Pat. No. 2,457,502, issued to Shepherd. The Shepherd patent discloses the use of modulated polarized light signals to selectively effect remote control operations by means of light or similar energy. One application described in the Shepherd patent is the use of polarized and modulated light to cause a control mechanism to function and result in the production of a predetermined traffic signal at an intersection. A system much simpler than this for changing traffic signals is currently offered by 3M and includes a High or Low Priority Emitter Assembly strobe light and the Opticom® brand detector installed at signalized intersections. A strobe light signal from an emergency vehicle is detected by the Opticom® detector and the traffic signal is changed to allow the emergency vehicle to pass through.

By using a 3M High or Low Priority Emitter Assembly, or similar strobe light to activate the alarm system of the present invention, an integrated system, that changes traffic signals and alerts drivers, can be implemented. The emergency vehicle needs only one transmitting strobe light for alerting the drivers of other vehicles and changing traffic signals to accommodate safe passage.

From the above analysis, it can be seen that the prior art references of which we are aware, individually and as a whole, do not disclose an emergency vehicle alarm system using a strobe light or laser light source to alert the occupants of an unsuspecting vehicle of an emergency vehicle on-call in the area.

SUMMARY OF THE INVENTION

The present invention is directed to a line of sight activated alarm system for indicating the presence of a first vehicle. The first vehicle could be a train or an emergency vehicle such as an ambulance, police car or fire truck equipped with a strobe light or laser light source. The system of the present invention comprises a photosensitive cell located on a second vehicle and connected to a receiver circuit. The receiver circuit receives a signal from the photosensitive cell, amplifies and filters the signal, and generates an indicator signal upon identification of a flashing strobe light or the appropriate laser light frequency. The indicator signal activates one or more indicators in the second vehicle to alert the occupants of the second vehicle to the proximity of the emergency vehicle.

The photosensitive cell is embodied in two alternative configurations. The first configuration is a photo cell that is the size of a silver dollar or quarter. It is assumed that the driver of the second vehicle will see emergency vehicles or trains approaching from the front or the sides when this photo cell configuration is used. The alarm system using the single photo cell configuration alerts the driver to the presence of an emergency vehicle approaching generally from the rear. The silver dollar shaped photo cell may be situated in a variety of positions facing vehicles approaching from the rear. Preferably, the photo cell is situated in the rear window well, in the stop light in the rear window well, on the rear view mirror or in the rear bumper-tail light area. The second photo cell configuration is an omni-directional photo cell array comprising multiple photo cells that are preferably mounted on the outside of the second vehicle on the roof or antenna. The photo cell array senses a strobe light or laser light signal from an emergency vehicle or train approaching from any direction. In each of these configurations, if the strobe light or laser light signal is in a line of sight of the photo cell the alarm system in the second vehicle will be activated. The photosensitive cell is not limited to a photovoltaic cell in either configuration but may be other photosensitive means for sensing a strobe light or laser light signal.

The photosensitive cell is connected to a receiver circuit comprising well-known circuitry for receiving and identifying the presence of the strobe light or laser light signal sensed by the photosensitive cell. For example, a 3M High Priority Emitter Assembly strobe light signal is identified by a repetition rate of 14 pulses per second of a high intensity light in the infrared or visible spectrum. A 3M Low Priority Emitter Assembly strobe light signal is identified by a repetition rate of 10 pulses per second of a similar high intensity light in the infrared or visible spectrum. The receiver identifies the signal as one coming from an emergency vehicle light source and generates an indicator signal. The indicator signal is amplified and distributed to the various indicators.

Three alternative indicators are used to alert the occupants of the unsuspecting second vehicle to the presence of an emergency vehicle or train. In one alternative, the car radio is muted or turned on for a specified period of time and a warning signal is announced through the car radio. The warning signal indicates that an emergency vehicle is in the area and caution is warranted. A second indicator transmits warning signals through a separate speaker system or buzzer. This is done either with or without muting or turning off the car radio. The third indicator is a video display on the car information panel. The display lights up and displays the words "Emergency Vehicle." Any combination of the above indicators may be used and the alternatives are not limited to those discussed above.

In addition to the indicators described above, a return indicator or feed-back signal is provided for notifying the driver of the emergency vehicle or train that the warning has been received by the second vehicle. The return indicator is preferably a constant or blinking white light source situated in the rear window well stop light and/or in the front or rear area of the second vehicle, next to the regular driving lights. Once activated, the return indicator remains lit for a specified period of time, such as five minutes. This allows law enforcement officials in the area of the emergency vehicle to identify cars that have received a light signal and refused to pull over. The drivers of the cars can then be ticketed.

Objectives, features and advantages of the present invention not previously mentioned will become apparent to those skilled in the art through the description of the preferred embodiment, claims, and drawings herein.

BRIEF DESCRIPTION OF THE DRAWINGS

FIG. 1 is a block diagram schematic of the present invention including the photosensitive cell, receiver circuit and indicators; and FIG. 2 is a diagrammatic view of two vehicles wherein one automobile has the photosensitive cell of the present invention situated in either the rear window well or on the roof and a return indicator situated in the rear window well stop light, and the emergency vehicle has a light source.

DESCRIPTION OF THE PREFERRED EMBODIMENT

Indicated in FIG. 1 is a block diagram schematic of an emergency vehicle alarm system 10 for alerting the occupants of a second vehicle to the presence of a first vehicle. The alarm system 10 comprises a photosensitive cell 12 connected to a receiver circuit 14 which is in turn connected to indicators 16 and a return, feed-back indicator 17. A light signal is sensed by the photosensitive cell 12. The receiver circuit 14, using well-known circuit configurations, senses or detects the signal in the detector portion 18 of the receiver circuit 14. The signal detected is relayed to the amplifier and filter 20 of the receiver circuit 14. The amplifier and filter 20 of the receiver circuit 14 amplifies, filters and identifies the detected signal as originating from an activated strobe or laser light source. Once the signal is identified as originating from the appropriate light source, a signal is relayed to the signal generator 22 of the receiver circuit 14. The signal generator 22 of the receiver circuit 14 generates the indicator signals for activating the internal indicators 16 and return, feed-back indicator 17 of the alarm system 10. When the present invention is used with a 3M High or Low Priority Emitter Assembly, the consistent pulsing of a high intensity light in the infrared or visible spectrum is detected and activates the indicators 16 and 17. The High Priority Emitter Assembly emits signals at a repetition rate of 14 pulses per second and the Low Priority Emitter Assembly emits signals at a repetition rate of 10 pulses per second.

As shown in FIG. 1, three different internal indicators are used to alert the occupants of the second vehicle to the presence of the first vehicle. One indicator is the second vehicle's radio system 24, a second indicator is a separate audio speaker or buzzer system 26 and a third indicator is a visual display 28. Additional circuitry is provided to turn on or mute the radio system 24 and transmit a signal over the radio system 24. The audio speaker or buzzer system 26 is activated independently of the radio system 24, or the radio system 24 can be temporarily muted or turned off and an indicator signal transmitted over the audio speaker or buzzer system 26. The visual display 28 flashes a warning signal such as the words "Emergency Vehicle" or a red light to indicate that a vehicle having an activated strobe or laser is in the area. The indicators 16 discussed above can be used separately or in any combination, including the use of all three indicators 16.

The return, feed-back indicator 17 is preferably a constant or blinking white light source. The feed-back indicator 17 may be situated in a variety of places on the second vehicle 30 including in the rear window well stop light, the front head-light area or the rear tail-light area. The second vehicle 30, as shown in FIG. 2, has the return, feed-back indicator 17 situated in the rear window well stop light. The feed-back indicator 17 notifies the occupants of the first vehicle 34 that the light signal transmitted was detected and processed by the second vehicle 30. The return, feed-back indicator 17 remains activated for a predetermined period of time, such as five minutes, to allow law enforcement officials to identify vehicles that have received an emergency signal but refused to pull over to the side of the road. The drivers of these vehicles can then be ticketed for refusal to pull over.

As diagrammed in FIG. 2, the alarm system 10 is situated on a second vehicle 30 and a strobe light or laser light source 32 is situated on a first vehicle 34. The first vehicle 34 may be any vehicle including a train, ambulance, police car or fire truck. The photosensitive cell 12, shown in FIG. 2 as silver dollar shaped photo cell 13 or omni-directional photo cell array 15, is preferably situated in either the rear window well stop light of the second vehicle 30 or on the roof 36 of the second vehicle 30. When the photosensitive cell 12 is mounted in the rear window well of the second vehicle 30, the alarm system 10 is used primarily to identify a first vehicle 34 approaching from the rear of the second vehicle 30. In this configuration, the photosensitive cell 12 is preferably the silver dollar shaped photo cell 13. The silver dollar shaped photo cell 13 may alternatively be placed in the stop light in the rear window well, on the rear view mirror of the second vehicle or in the rear bumper-tail light area.

In the alternative configuration, the photosensitive cell 12 is the omni-directional photo cell array 15 mounted on the roof 36 of the second vehicle 30. Preferably five photo cells are arranged in a semi-spherical or box shape, having five sides, to make up an omni-directional photo cell array 15. Of course, the array may be made up of fewer or more photosensitive cells, as desired. The alarm system 10 in this configuration is used to detect a flashing strobe or laser light 32 coming from any direction. As long as the flashing strobe light or laser light 32 mounted on the first vehicle 34 is in a line of sight of a photosensitive cell 12, the light source 32 is detected and the occupants in the second vehicle 30 are alerted to the presence of the first vehicle 34.

In operation, the first vehicle 34 activates the light source 32. The signal emitted from the light source 32 is sensed or detected by one of the photosensitive cells 12 on the second vehicle 30 and processed by the receiver 14. A return signal is transmitted from the return, feed-back indicator 17 to notify the driver of the first vehicle 34 that the signal from the light source 32 was received by the second vehicle 30. Indicators 16 inside the second vehicle 30 alert the occupant to the presence of the first vehicle 34. The return, feed-back indicator remains activated to alert law enforcement officials to vehicles that receive a signal but do not pull over. The drivers of these vehicles may then be ticketed. In this manner, the hazards of a speeding emergency vehicle or train are minimized.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to the equipment details and operating procedures, can be accomplished without departing from the scope of the invention itself.

What is claimed is:

1. A collision avoidance system for preventing collisions between a first land-traveling emergency vehicle and a second land-traveling vehicle, comprising:

(a) light signaling means carried by the first land-traveling emergency vehicle for emitting a light signal indicative of the first land-traveling emergency vehicle, said light signaling means emitting the light signal to the second land-traveling vehicle on a line-of-sight;

(b) light receiving means carried by the second land-traveling vehicle for receiving and identifying the line-of-sight light signal as coming from the first land-traveling emergency vehicle and generating an indicator signal; and (c) indicator means carried by the second land-traveling vehicle for acknowledging receipt of the line-of-sight light signal coming from the first land-traveling emergency vehicle, said indicator means transmitting a visible return white light signal to the occupant of the first land-traveling emergency vehicle to notify the occupant of the first land-traveling emergency vehicle that the second land-traveling vehicle received the line-of-sight light signal, said indicator means connected to said light receiving means and activated by the indicator signal.

2. The system of claim 1, wherein said light receiving means comprises an array of photocells for sensing the line-of-sight light signal from any direction.

3. The system of claim 1, wherein said visible return white light signal is transmitted for a predetermined time period.

4. The system of claim 3, wherein said light signaling means includes a strobe light which emits a high intensity light at a repetition rate of about 10 pulses per second.

5. The system of claim 3, wherein said light signaling means includes a strobe light which emits a high intensity light at a repetition rate of about 14 pules per second.

6. A line-of-sight collision avoidance system for preventing collisions between a first land-traveling emergency vehicle and a second land-traveling vehicle, the system comprising:

(a) strobe light means carried by the first land-traveling emergency vehicle for emitting a strobe light signal indicative of the first land-traveling emergency vehicle, said strobe light means emitting the strobe light signal on a line-of-sight to the second land-traveling vehicle;

(b) a photosensitive sensor carried by the second land-traveling vehicle for sensing the strobe light signal and generating a sensed signal upon sensing the strobe light signal;

(c) signal receiving means for receiving the sensed signal and generating an indicator signal, said signal receiving means carried by the second land-traveling vehicle and connected to said photosensitive sensor;

(d) indicator means carried by the second land-traveling vehicle for indicating the detection of the strobe light signal to an occupant of the second land-traveling vehicle, said indicator means connected to said signal receiving means and activated by the indicator signal; and (e) response means carried by the second land-traveling vehicle and facing away from the second land-traveling vehicle for emitting a visible return white light signal in response to the strobe light signal to an occupant of the first land-traveling emergency vehicle, said response means connected to said signal receiving means and activated by the indicator signal.

7. The system of claim 6, wherein said strobe light means emits a high intensity light at a repetition rate of about 10 pulses per second.

8. The system of claim 6, wherein said strobe light means emits a high intensity light at a repetition rate of about 14 pulses per second.

9. The system of claim 6 wherein said visible return white light signal is emitted for a predetermined time period.

10. The system of claim 9 wherein said photosensitive sensor comprises an array of photocells for sensing the line-of-sight strobe light signal from any direction.

* * * * *